United States Patent
Yang

(10) Patent No.: US 9,152,479 B2
(45) Date of Patent: Oct. 6, 2015

(54) APPARATUS AND METHOD FOR PROCESSING EVENT NOTIFICATION

(71) Applicant: PANTECH CO., LTD., Seoul (KR)

(72) Inventor: Hea-Beck Yang, Namyangju-si (KR)

(73) Assignee: Pantech Co., Ltd., Seoul (KR)

( * ) Notice: Subject to any disclaimer, the term of this patent is extended or adjusted under 35 U.S.C. 154(b) by 106 days.

(21) Appl. No.: 14/134,548

(22) Filed: Dec. 19, 2013

(65) Prior Publication Data

US 2014/0181843 A1     Jun. 26, 2014

(30) Foreign Application Priority Data

Dec. 20, 2012  (KR) ................ 10-2012-0149784

(51) Int. Cl.
  *G06F 13/00*     (2006.01)
  *G06F 9/54*      (2006.01)

(52) U.S. Cl.
  CPC ..................... *G06F 9/542* (2013.01)

(58) Field of Classification Search
  CPC .............................................. G06F 9/542
  USPC .............................................. 719/318
  See application file for complete search history.

(56) References Cited

U.S. PATENT DOCUMENTS

| 7,209,955 | B1 * | 4/2007 | Major et al. ................ 709/207 |
| 7,957,718 | B2 | 6/2011 | Gaskarth et al. |
| 2011/0084818 | A1 * | 4/2011 | Graham ................ 340/407.1 |
| 2012/0179978 | A1 | 7/2012 | Klassen et al. |
| 2012/0295645 | A1 | 11/2012 | Yariv et al. |
| 2013/0346521 | A1 * | 12/2013 | Arabo et al. ................ 709/206 |
| 2014/0074921 | A1 * | 3/2014 | Poornachandran et al. .. 709/204 |

FOREIGN PATENT DOCUMENTS

| JP | 2005-301791 | 10/2005 |
| JP | 2006-229498 | 8/2006 |
| JP | 2010-022043 | 1/2010 |
| JP | 2011-061814 | 3/2011 |
| JP | 2011-114569 | 6/2011 |
| KR | 10-2012-0019168 | 3/2012 |
| WO | 2012170446 | 12/2012 |

* cited by examiner

*Primary Examiner* — Andy Ho
(74) *Attorney, Agent, or Firm* — H.C. Park & Associates, PLC

(57) ABSTRACT

A method for processing an event notification includes recognizing an event to be indicated via a mobile apparatus, determining whether a default notification scheme for the event is prohibited by a notification setting of the mobile apparatus, and, if the default notification scheme for the event is prohibited by the notification setting of the mobile apparatus, determining a modified notification scheme for the event and notifying the event according to the modified notification scheme.

22 Claims, 12 Drawing Sheets

FIG. 7

APPARATUS AND METHOD FOR PROCESSING EVENT NOTIFICATION

CROSS-REFERENCE TO RELATED APPLICATIONS

This application claims priority from and the benefit under 35 U.S.C. §119(a) of Korean Patent Application No. 10-2012-0149784, filed on Dec. 20, 2012, which is hereby incorporated by reference for all purposes as if fully set forth herein.

BACKGROUND

1. Field

The following description relates to an event notification to indicate the occurrence of an event, and more particularly, to an event notification using a notification interface, e.g., a popup window.

2. Discussion of the Background

In communications between terminal devices, such as smartphones, a variety of events may occur, including incoming call, receipt of messages, system state change, etc. Generally, in smartphone communications, a popup window or a status bar on top of the display screen is usually used to indicate an event. FIG. 1 illustrates a diagram of an operating system configuration for an event notification, whereby the occurrence of an event is broadcast to each application in a smartphone, and the broadcast event notification is processed in a broadcast receiver in the application and the processing result is displayed on a display screen. Referring to FIG. 1, in response to a request from a broadcast component, an ActivityManagerService may activate registered receivers corresponding to an action associated with the request. Accordingly, the user may easily recognize the occurrence of the event. However, if a popup window for an event notification appears on a display, as shown in FIG. 2, while a user is enjoying a game or video content displayed on the entire display screen, the popup window may disturb the user. In other words, the event notification may cause inconvenience to the user because the notification is automatically delivered in a popup window regardless of a current state of a terminal device. Further, even if the popup window is not displayed on the screen of the terminal device, the event notification may cause a temporary disturbance to the operation of the executed application.

SUMMARY

Exemplary embodiments of the present invention provide an apparatus and a method for processing an event notification.

Additional features of the invention will be set forth in the description which follows, and in part will be apparent from the description, or may be learned by practice of the invention.

Exemplary embodiments of the present invention provide a method for processing an event notification, including: recognizing an event to be indicated via a mobile apparatus; determining whether a default notification scheme for the event is prohibited by a notification setting of the mobile apparatus; and if the default notification scheme for the event is prohibited by the notification setting of the mobile apparatus, determining a modified notification scheme for the event and notifying the event according to the modified notification scheme.

Exemplary embodiments of the present invention provide a method for processing an event notification, including: recognizing an event to be indicated via a mobile apparatus; determining an execution status of the mobile apparatus; determining whether a default notification scheme for the event is prohibited for the execution status of the mobile apparatus; and if the default notification scheme for the event is prohibited for the execution status of the mobile apparatus, determining a modified notification scheme for the event and notifying the event according to the modified notification scheme.

Exemplary embodiments of the present invention provide a mobile apparatus to process an event notification, including: a non-transitory storage device including executable instructions which, when executed by one or more processors, causes the one or more processors to perform: recognizing an event to be indicated via the mobile apparatus; determining whether a default notification scheme for the event is prohibited by a notification setting of the mobile apparatus; and if the default notification scheme for the event is prohibited by the notification setting of the mobile apparatus, determining a modified notification scheme for the event and notifying the event according to the modified notification scheme.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a diagram illustrating examples of a sender selection screen of user settings for a notification-free function.

Figure 1:
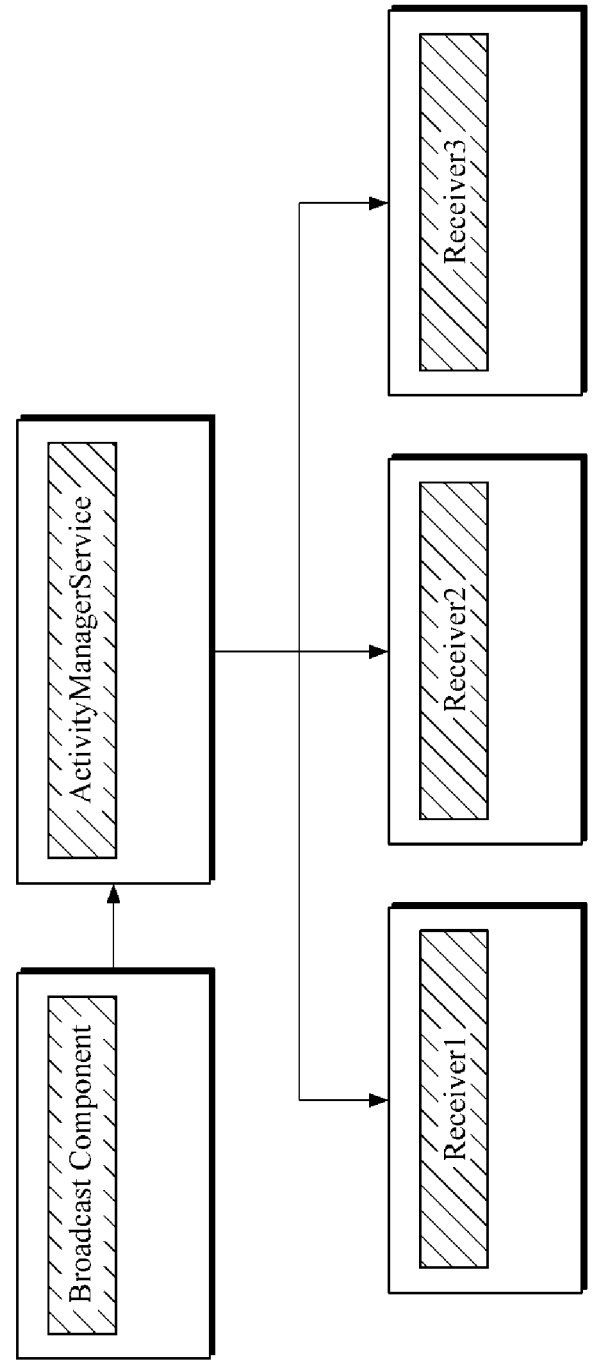
FIG. 1 is a diagram illustrating an operating system (OS) configuration for event notification according to the related art.
Figure 2:
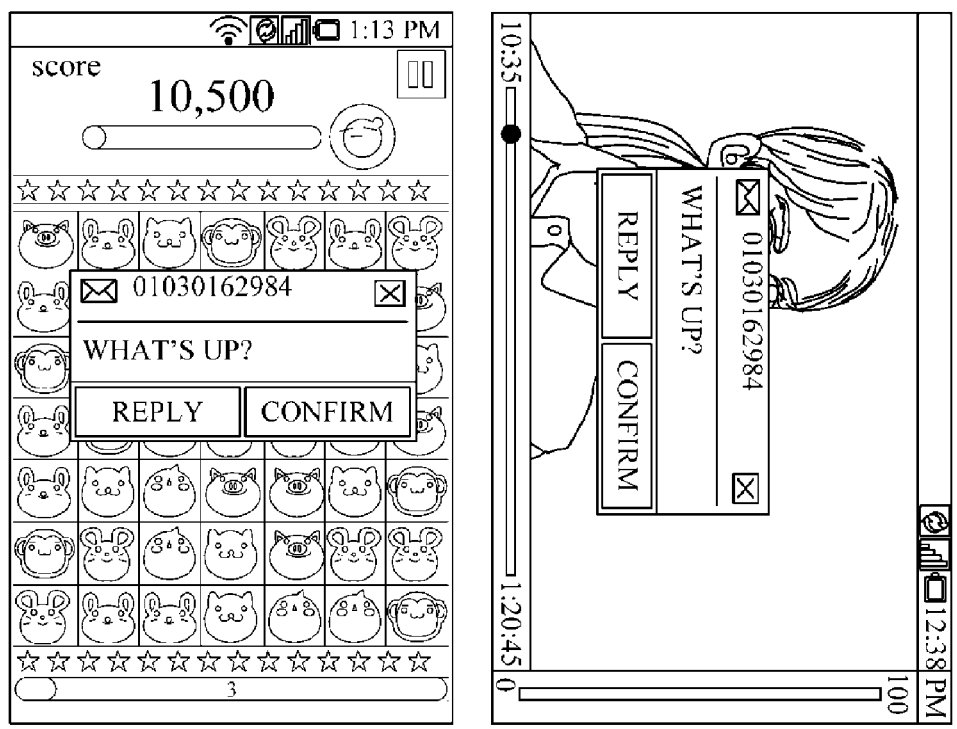
FIG. 2 is a diagram illustrating event notification screens using a popup window according to the related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 3:
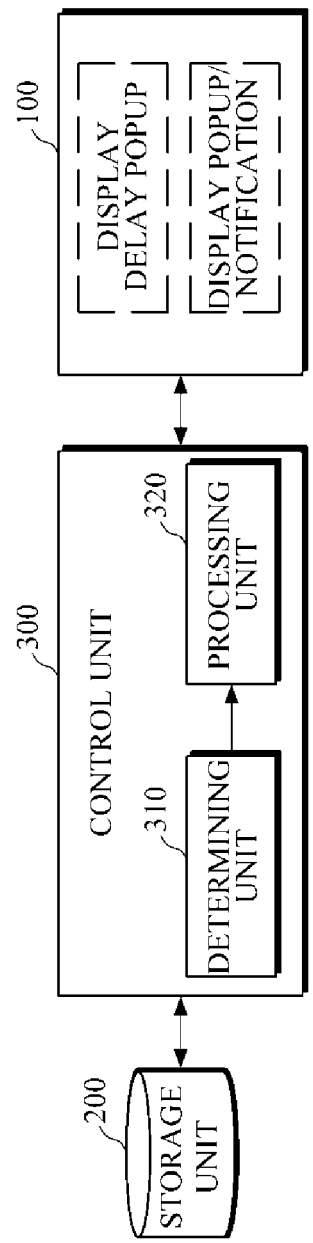
FIG. 3 is a block diagram illustrating an event processing apparatus according to an exemplary embodiment of the present invention.
Figure 4:
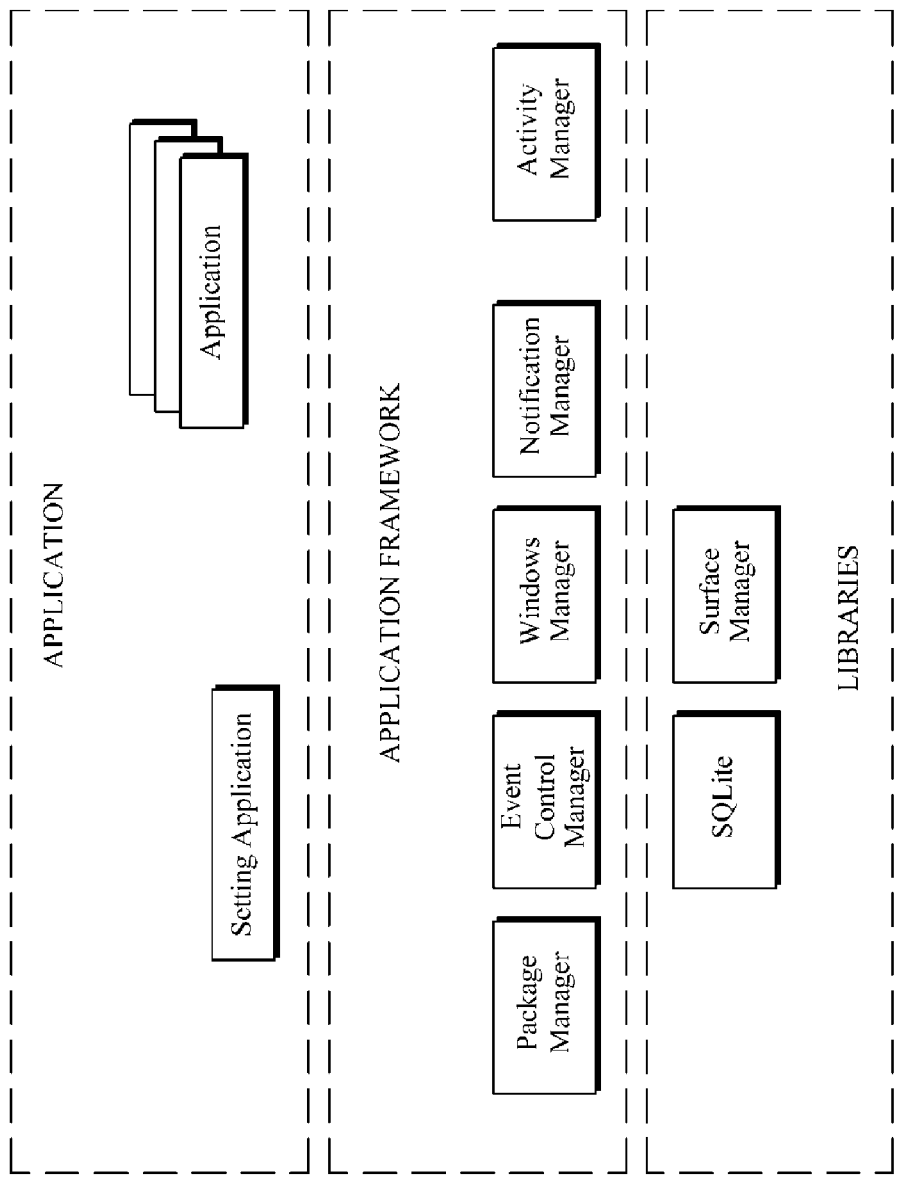
FIG. 4 is a diagram illustrating a software stack including an operating system (OS) layer structure according to an exemplary embodiment of the present invention.

FIG. 3 illustrates a block diagram of an event processing apparatus according to an exemplary embodiment of the present invention. FIG. 4 illustrates a diagram of an operating system (OS) layer structure according to an exemplary embodiment of the present invention.

An event processing apparatus illustrated in e.g., FIG. 3 may be a computing device, such as a smartphone, a smart pad, tablet computer, laptop computer, or desktop computer. As shown in FIG. 3, the event processing apparatus may include a display unit 100, a storage unit 200, and a control unit 300. Further, the event processing apparatus may include one or more processors, communication modems, antennas, a touch screen display, and the like to implement the operations of the display unit 100, the storage unit 200, and the control unit 300 and to perform various instructions of modules embedded in the event processing apparatus. The display unit 100 may be a display device, such as a liquid crystal display (LCD), an organic light emitting diodes (OLED), and the like, and include a touch panel to receive a touch input. When an application is executed, the display unit 100 may display content that is played back via the executed application. Further, the display unit 100 may display notifications and/or popups, which may or may not be delayed. The storage unit 200 may be a non-volatile memory to store information regarding predefined criteria for determining whether to delay an event notification or whether to change an event notification scheme to be used in the occurrence of an event in another application. The control unit 300 may include one or more control chips to control the overall performance of the computing device. The control unit 300 may include a determining unit 310 and a processing unit 320 to provide an event notification function. In response to an event occurring related to a second application while a first application is running, the determining unit 310 may determine whether the event falls within predefined criteria. In response to a determination that the event falls within the predefined criteria, the processing unit 320 may delay an event notification or change a notification scheme. Further, the determining unit 310 may determine an attribute of an occurred event, an attribute of executed content, and an attribute of an executed application for determining whether to delay or change an event notification. The processing unit 320 may calculate a weight value for a certain parameter to determine whether to delay or change an event notification.

FIG. 4 is a diagram illustrating a software stack including an operating system (OS) layer structure according to an exemplary embodiment of the present invention. FIG. 4 illustrates an OS-layer structure for the event notification function. The illustrated software stack structure may include Android-based software stack architecture, a modified version thereof or other types of software stack structure, but the present invention is not limited thereto. As shown in FIG. 4, a variety of applications may be built on the application layer, and the installed applications may include a bus tracker application, a game application, a stock trading application, a cartoon application, a personal finance management application, and the like. The application framework layer includes package manager, window manager, notification manager, and activity manager. Further, an event control manager may be configured in the stack structure to manage an event notification according to different settings. The package manager manages information related to an application loaded onto a system, and the window manager manages all windows related to the applications. The notification manager manages a notification e.g., a notification on a status bar, and the activity manger manages a lifecycle of each application. The event control manager manages an event notification in the occurrence of an event, according to a system's execution environment, to delay an event notification or change a notification scheme to perform the event notification. Library layer is a common layer which is accessible by a third party. The library layer written in C language, fully tested, includes libraries for 2D, 3D graphic, and libraries for audio, video and web browsing. As shown in FIG. 4, the library layer includes SQLite and surface manager. SQLite is a relational database engine for all applications, and the surface manager manages 2D and 3D graphic layers used in a display sub-system and a number of applications, in a unified manner.

Figure 5:
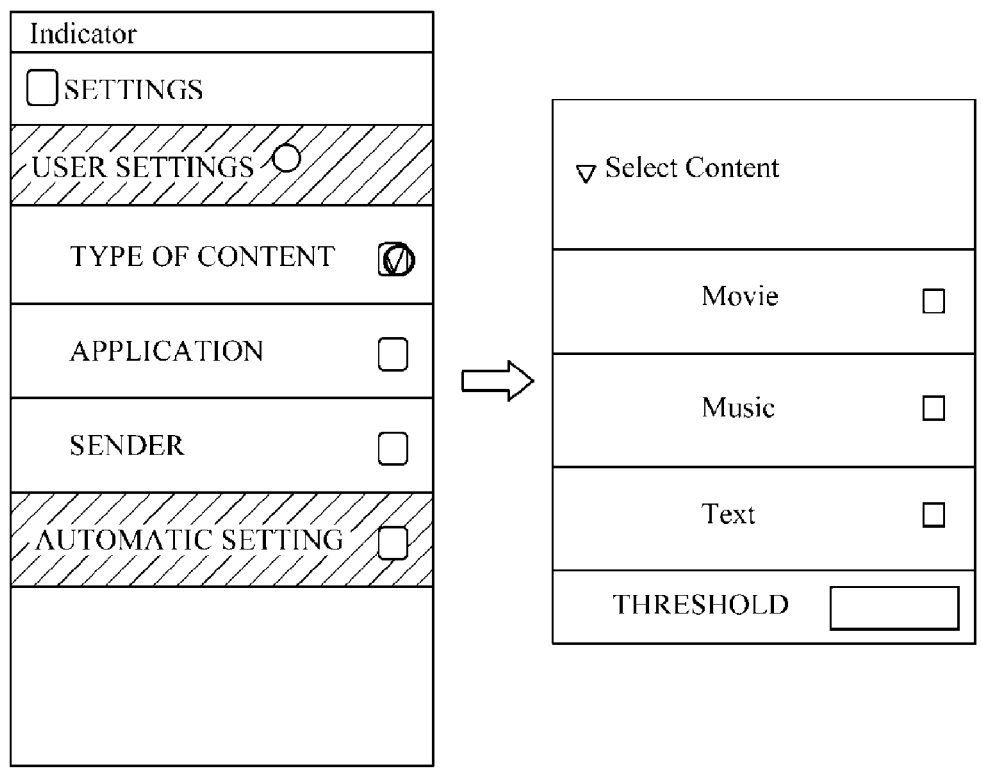
FIG. 5 is a diagram illustrating examples of a content selection screen of user settings for a notification-free function.
Figure 6:
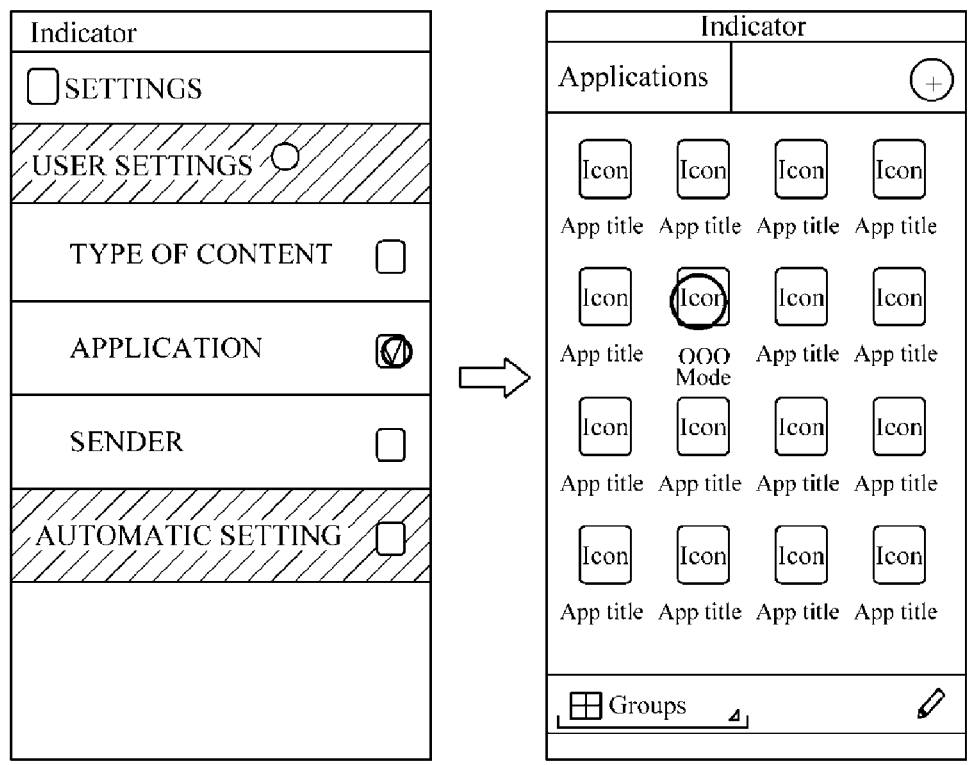
FIG. 6 is a diagram illustrating examples of an application selection screen of user settings for a notification-free function.
Figure 7:
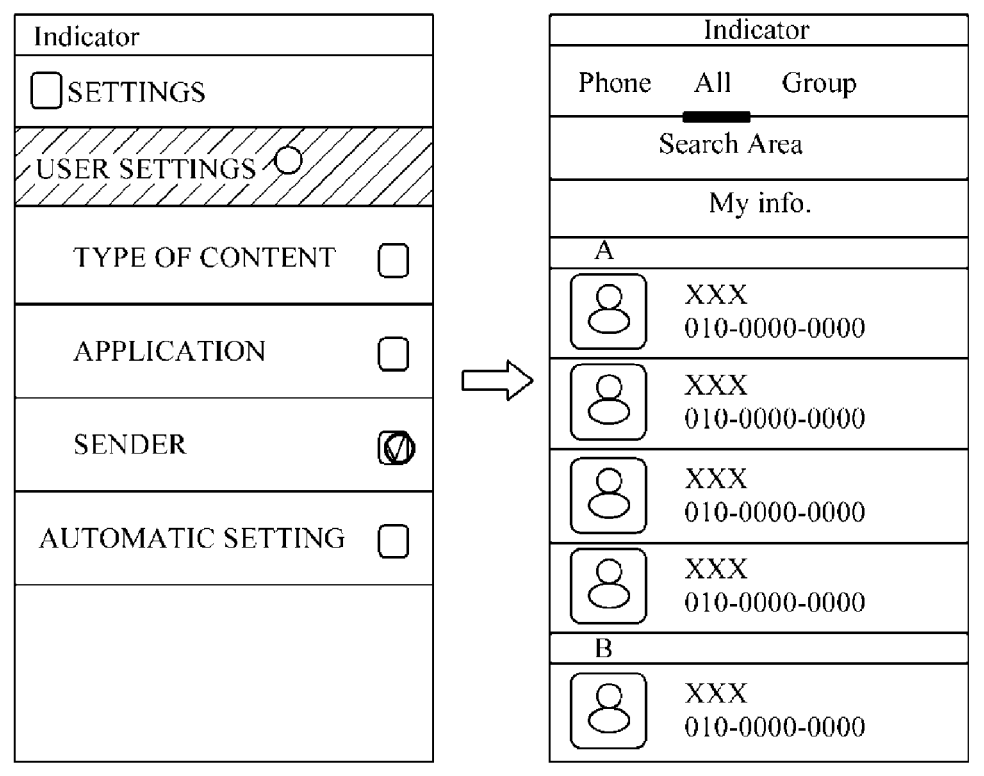

Further, the application layer may include a setting application to prevent the user from being disturbed by an event notification while the user is using content, such as video content or a game. The setting application allows the user to set an event notification-free function. The user may execute the setting application to set the event notification-free function to be applied in a particular system environment, and this setting operation is referred to as "user settings". Examples of the user settings are shown in FIG. 5, FIG. 6, and FIG. 7. As shown in FIG. 5 to FIG. 7, the user may select one of content, an application, and a sender, for example. In content setting, the user may select a content type to which the notification-free function is applied, as shown in FIG. 5. For example, the user may select a video from various types of content, such as images, videos, and text content, and the notification-free function may be applied when video content is played back in the terminal. In this case, a multiple selection is available as well. The user may set a threshold for content, such as a video clip or a movie, a music video, game, etc., each of which has different running time. The threshold may be used in determining whether to delay an event notification when an event occurs in another application while the user is using the content. The threshold may not be set by an input from the user, but may be automatically set to a default value. For example, if the remaining running time of a movie is longer than the threshold, the event notification may not be delayed. If the remaining running time of a video clip is shorter than the threshold, the event notification may be delayed until the play back of the video clip is terminated.

The user may select an application from a list of applications registered in a system, as shown in FIG. 6, so as to apply a notification-free function thereto. In this case, a multiple selection of notification-free applications is also available. As shown in FIG. 7, senders to be selected may be separately arranged in a phone number list or a call log screen according to their importance, or may be distinguished based on whether the contact number is stored in contact information, e.g., a contact list or a contact group. In the former case, the senders may be arranged individually or in groups, such as friends, family, colleagues, and the like. As such, the user may select at least one or more of content, applications, and senders, to apply a notification-free function thereto. Further, not only the user settings that define conditions in which the notification-free function is applied, but also default or automatic settings may be available, as shown in FIG. 5 to FIG. 7, which allow the notification-free function to be automatically performed.

Figure 8:
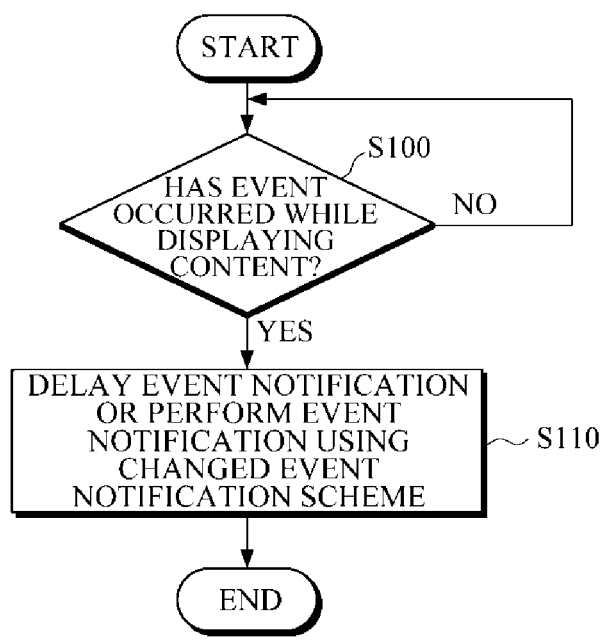
FIG. 8 is a flowchart illustrating a method of performing a notification-free function according to an exemplary embodiment of the present invention.

FIG. 8 is a flowchart illustrating a method of performing a notification-free function according to an exemplary embodiment of the present invention.

Hereinafter, the operations of the determining unit 310 and the processing unit 320 for performing an event notification may be described as the operation of the control unit 300.

The control unit 300 determines whether an event, such as a receipt of a message, which is related to a second application, occurs while a first application is being executed and content of the first application is being displayed on the display unit 100 in operation S100. More specifically, it is determined whether an event of another application occurs while the content, such as a game, a still image or a video image, is being displayed on the display unit 100, or while e-book content is being displayed by an e-book application. In response to a determination that the event occurs in the process of displaying the content, the control unit 300 may delay an event notification or change a notification scheme to perform the event notification in operation S110. For the delay of the event notification, the control unit 300 may notify the user of the occurrence of an event once the notification-free application or content completes the execution thereof. In this case, the notification may be made by a basic notification scheme, and the basic notification scheme may use a popup window or a status bar.

For the change of the event notification scheme, the control unit 300 may change the basic notification scheme to a different scheme, which can reduce the disturbance to the user when notifying of the occurrence of an event. In an example, the control unit 300 may indicate the occurrence of an event such that the display of a notification occupies a smaller area in the display screen than the popup window. For example, the control unit 300 may display a notification message in a designated area of the display unit 100 instead of displaying the popup window that shows a partial content of an event. Accordingly, the occurrence of an event is able to be indicated while the display of the executed application or content on the display unit 100 is less disturbed, and thereby it may reduce the disturbance to the user. In another example, the control unit 300 may use resources for notification in a different way. For example, the control unit 300 may change the basic notification scheme that uses screen resources to a notification scheme that uses audio resources. The control unit 300 may indicate the occurrence of an event by a short beep sound. In this case, the beep sound may differ according to types of events.

Figure 9:
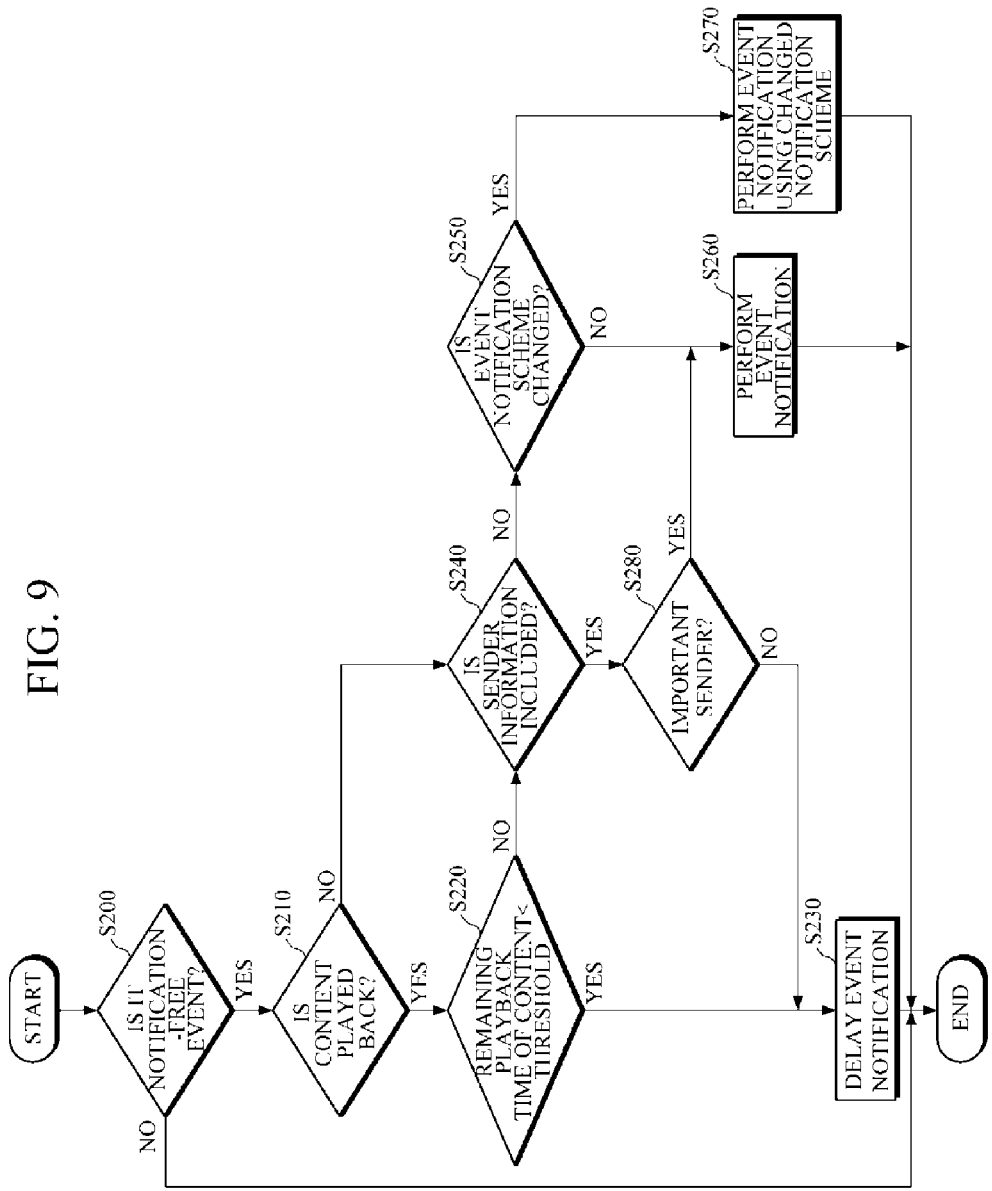
FIG. 9 is a flowchart showing an example of operation S110 of FIG. 8 when the notification-free function is automatically set according to an exemplary embodiment of the present invention.

FIG. 9 is a flowchart showing an example of operation S110 of FIG. 8 when the notification-free function is automatically set according to an exemplary embodiment of the present invention.

The control unit 300 checks whether an occurred event is an event (hereinafter, will be referred to as "notification-free event") to which a notification-free function is applied in operation S200. The notification-free function may include a delay of an event notification and/or a change of an event notification such that an interrupt by an event notification according to a default setting is reduced or prevented. In an example, a notification-free event may be an event that is caused by a communication with an external system ("external event"), which is different from an event caused by the internal system of the event processing apparatus ("internal event"). The external event may include, e.g., incoming call, a text message, and the like, and the internal event may include system state change, alarm, battery low alert, and the like. Some of the events occurring internally can be notification-free events. For example, scheduled alarms or the battery low alert may be notification-free events. Such notification-free events may be initially set as default, or changed by user settings. The determination whether to apply a notification-free function may be determined based on an attribute value of the occurred event. For example, if the attribute value of the occurred event indicates that the occurred event is an event to be indicated by the default setting, the event notification for the occurred event may not be delayed or changed. If the attribute value of the occurred event indicates that the occurred event is an event that can be delayed or changed according to specific settings, the process of handling the event notification may be performed, e.g., the process including the operations S210, S220, S230, S240, S250, S260, S270, and S280. Further, the operation S200 may be omitted. If the operation S200 is omitted, at least one of or all the operations S210 to S280 may be performed in response to an occurrence of an event.

If the occurred event is confirmed as a notification-free event, the control unit 300 checks whether to maintain the playback of the content currently being displayed on the display unit 100 in operation S210. More specifically, the control unit 300 may check whether the content has an execution-end time for terminating the playback of the content. Such content may include video content, audio content, and the like. If the content is being played back, the control unit 300 may determine whether the remaining playback time is less than a threshold in operation S220. The threshold may be 3 minutes, 5 minutes, 10 minutes or the like. The threshold may be a default value or a value set by the user. If it is determined that the remaining playback time is less than the threshold, the control unit 300 may delay an event notification in operation S230. The event notification is delayed until the playback of the content is terminated. If it is determined that the remaining playback time of the content is greater than the threshold in S220, the control unit 300 checks whether the occurred event includes sender information in S240. The event, which may include the sender information, may be a receipt of a text message. Further, in response to the determination that the occurred event is a notification-free event as determined in the operation S200, it may be determined whether to perform the operation S210, the operation S240 or the operation S250.

If the sender information is not included, the control unit 300 determines whether to change a notification scheme to another in operation S250. In an example, the control unit may analyze a display screen's configuration state based on screen display information provided from a content provider on application framework layer, and determines whether to change the notification scheme according to the analysis result. Here, the screen display information refers to information on layout of content displayed on the display unit 100. From this layout information, the control unit 300 may recognize whether the content displayed on the display unit 100 occupies a whole or a part of the display screen of the display unit 100. The control unit 300 may determine whether to use a basic notification scheme or change to another notification scheme to indicate an event, according to a current state of the content being displayed on the display screen. For example, the control unit 300 may determine the notification scheme according to the ratio of the display screen occupied by the content. In this case, if the content covers the entire display screen, the control unit 300 may determine to change an event notification scheme to another. Further, the control unit 300 may determine whether to change the event notification scheme according to the position of the layout in the display screen, regardless of the fact that the content does not cover the entire screen. According to the determination result, the control unit 300 uses the basic notification scheme in operation S260 or changes the notification scheme in operation S270 to perform an event notification.

If it is determined that the content includes sender information in operation S240, the control unit 300 determines whether the sender indicated by the sender information is important or not in operation S280 based on the predefined settings. For example, the control unit 300 may retrieve a contact list or call log information to determine the importance of the sender. If it is determined that the sender is important, the control unit 300 performs an event notification using the basic notification scheme in operation S260. If it is determined that the sender is not important, the control unit 300 delays the event notification in operation S230. The important sender may be set by the user as described above with reference to FIG. 7. Further, an importance value of a sender or an importance value of a group in the contact list may be calculated. The event notification may be delayed if the importance value is smaller than a threshold, and the operation S250 may be performed if the importance value is greater than or equal to the threshold.

Further, the control unit 300 may directly perform the operation S240 in response to the occurrence of an event while displaying the content or in response to a determination that the occurred event is a notification-free event. If the determination result of operation S240 indicates that the sender information is included in the occurred event and the determination result of operation S280 indicates that the sender is an important sender, the control unit 300 uses the basic notification scheme to indicate the occurrence of the event as shown in the operation S260 of FIG. 9. If the sender is not an important sender, the control unit 300 delays the event notification or changes the notification scheme. For example, if the sender is not an important sender, the control unit 300 may check whether the event being currently displayed on the display unit 100 is being played back. If it is determined that the content is being played back, the control unit 300 may check whether the remaining playback time of the content is less than the threshold. If the remaining playback time is less than the threshold, the control unit 300 delays the event notification as shown in the operation S230 of FIG. 9. If the playback remaining time is greater than the threshold, the control unit 300 determines whether to change the event notification scheme as shown in the operation S250 of FIG. 9. If the determination result indicates that the content is not being played back, the control unit 300 may determine whether to change the event notification scheme as shown in the operation S250 of FIG. 9.

Figure 10:
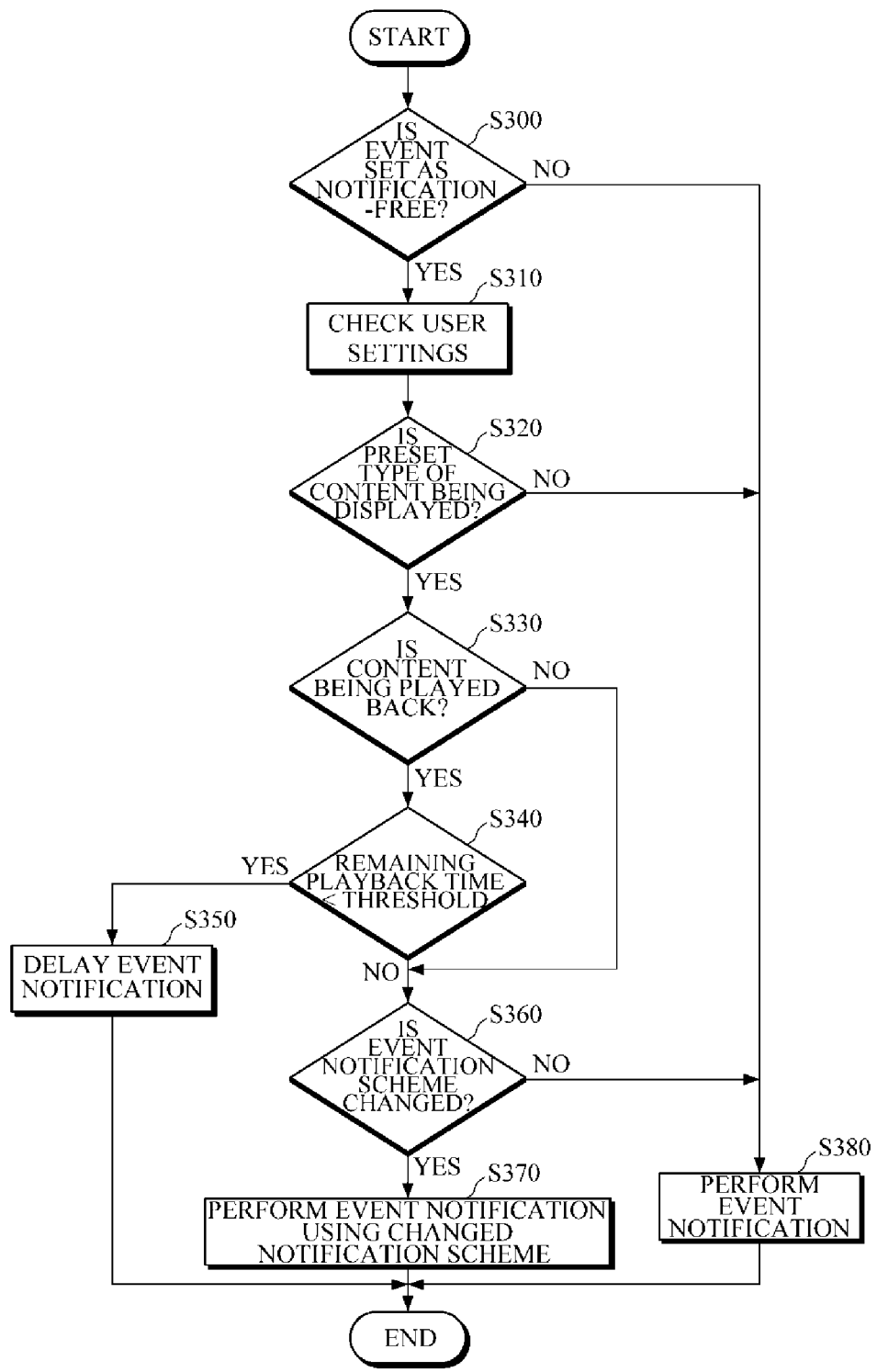
FIG. 10 is a flowchart showing an example of operation S110 of FIG. 8 when content to which a notification-free function is applied is specified in user settings, according to an exemplary embodiment of the present invention.

FIG. 10 illustrates a flowchart showing an example of operation S110 of FIG. 8 when content to which a notification-free function is applied is specified in user settings, according to an exemplary embodiment of the present invention.

The control unit 300 determines whether an occurred event is a notification-free event in operation S300. The notification-free event may be determined based on whether the occurred event is a system event, such as power management alert, the low battery alert, alarm, etc. The system event may be excluded from the notification-free event and may be displayed without delaying or changing the notification scheme. Operation S300 of FIG. 10 may be the same as the operation S200 of FIG. 9. In response to a determination that the occurred event is a notification-free event, the control unit 300 checks user settings in operation S310. The flowchart shown in FIG. 10 may be applied for a scheme in which content for notification-free is selected in the user setting process. Thus, after checking the user settings, the control unit 300 checks whether the type of content being currently displayed on the display unit 100 is selected in the user settings in operation S320. In response to a confirmation that the type of the current content is specified in the user settings, the control unit 300 determines whether the content is being played back in operation S330. If the content is being played back, the control unit 300 checks whether the remaining playback time of the content is less than a threshold in operation S340. If the remaining playback time is less than the threshold, the control unit 300 delays an event notification in operation S350. If the remaining playback time is greater than or equal to the threshold, the control unit 300 determines whether to change the event notification scheme in operation S360. A method for determining whether to change the event notification scheme in the operation S360 may be the same as the operation S250 of FIG. 9. According to a determination result of S360, the control unit 300 changes the basic notification scheme to another scheme to perform an event notification in operation S370, or uses the current basic notification scheme to indicate the occurrence of an event in operation S380. If it is determined that the type of the current displayed content is not selected in the user settings as determined in the operation S320, the control unit 300 performs operation S380, and if it is determined that the content is not being played back as determined in the operation S330, the control unit 300 performs operation S360.

Figure 11:
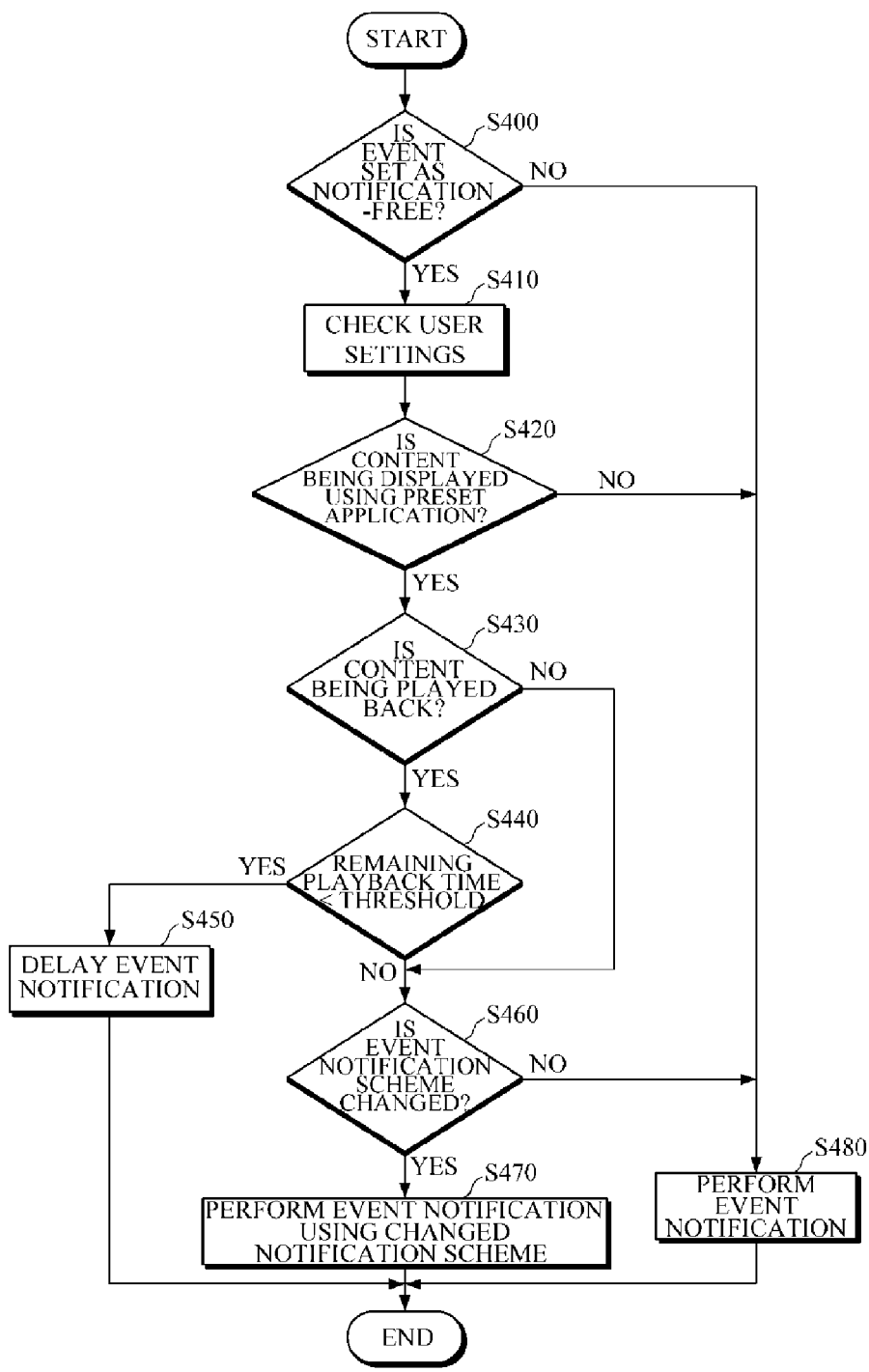
FIG. 11 is a flowchart showing an example of operation S110 of FIG. 8 when an application to which a notification-free function is applied is specified in user settings, according to an exemplary embodiment of the present invention.

FIG. 11 is a flowchart showing an example of operation S110 of FIG. 8 when an application to which a notification-free function is applied is specified in user settings, according to an exemplary embodiment of the present invention.

The control unit 300 checks whether an occurred event is a notification-free event in operation S400. Operation S400 of FIG. 11 may be the same as the operation S200 of FIG. 9. In response to a confirmation that the event is a notification-free event, the control unit 300 checks the user settings in operation S410. The flowchart of FIG. 11 may be applied to a scheme in which the application for executing under notification-free settings is selected in the user setting process. Thus, after checking the user settings, the control unit 300 checks whether content currently being displayed on the display unit 100 is executed by an application that is selected in the user setting process in operation S420. According to the check result of the operation S420, the control unit 300 performs operations S430, S440, S450, S460, S470, and S480, which are the same as operations S330, S340, S350, S360, S370, and S380 of FIG. 10, respectively. Therefore, the detailed descriptions of these operations will not be reiterated.

Figure 12:
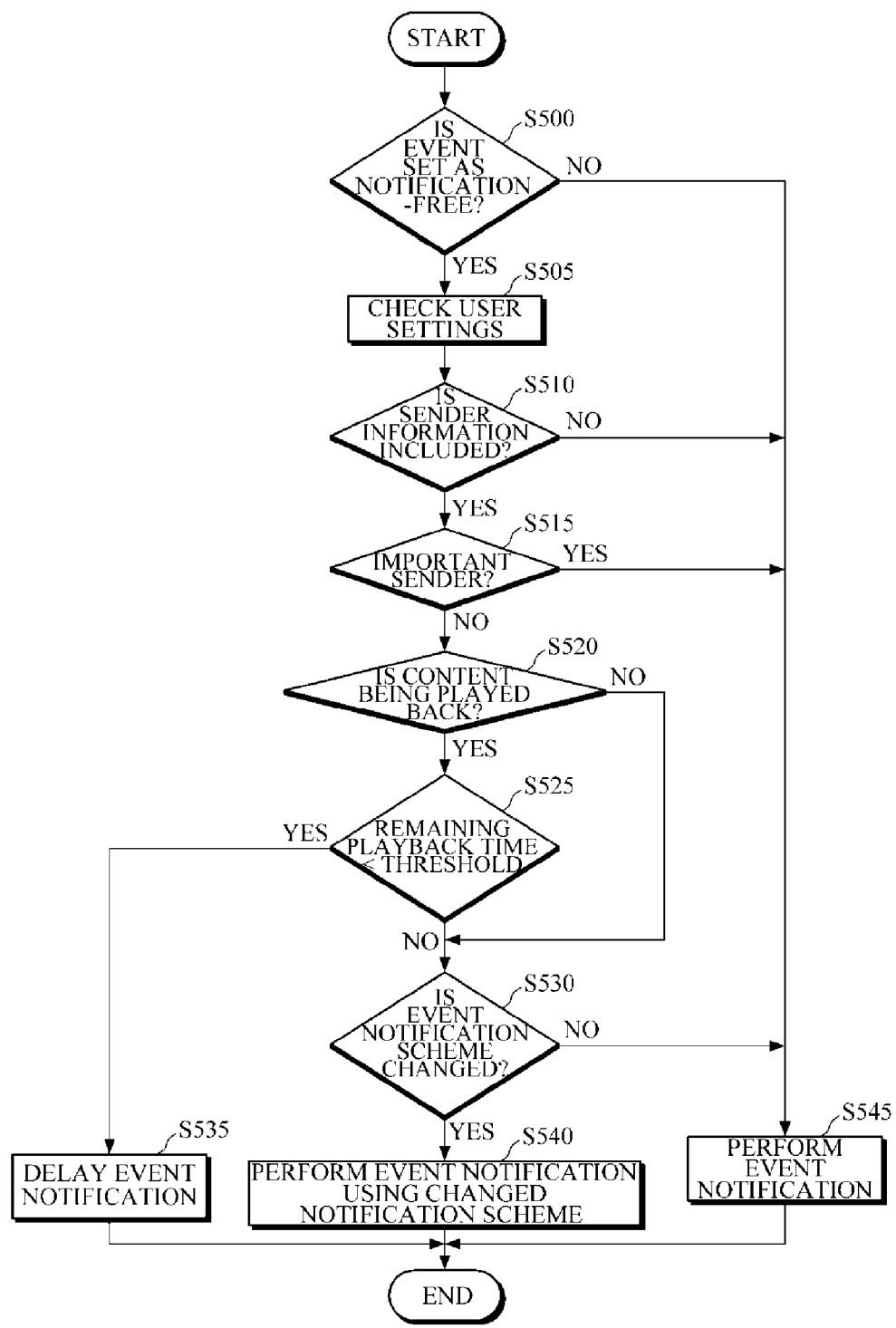
FIG. 12 is a flowchart showing an example of operation S110 of FIG. 8 when a sender to which a notification-free function is applied is specified in user settings, according to an exemplary embodiment of the present invention.

FIG. 12 is a flowchart showing an example of operation S110 of FIG. 8 when a sender to which a notification-free function is applied is specified in user settings, according to an exemplary embodiment of the present invention.

The control unit 300 checks whether an occurred event is a notification-free event in operation S500. Operation S500 of FIG. 12 may be the same as the operation S200 of FIG. 9. In response to a confirmation that the event is a notification-free event, the control unit 300 checks user settings in operation S505. The flowchart of FIG. 12 may be applied to a scheme in which the sender is selected in the user setting process. Thus, after checking the user settings, the control unit 300 checks whether the occurred event includes sender information in operation S510. If the sender information is included, the control unit 300 determines whether a sender of the sender information is an important sender in operation S515. If the sender is an important sender, the control unit 300 performs an event notification using a basic notification scheme in S545. If the sender is not determined as an important sender, the control unit 300 determines whether the currently displayed content is being played back in operation S520. According to the check result of the operation S520, the control unit 300 performs operations S525, S530, S535, S540, and S545, which are the same as the operations S340, S360, SS350, S370, and S380 of FIG. 10, respectively. Therefore, the detailed descriptions of these operations will not be reiterated. In another example, if it is determined that the current content is being played back in the operation S520, the control unit 300 may delay an event notification. More specifically, the control unit 300 may not perform the event notification until the playback of the content is terminated.

Further, if two or more of content, an application, and/or a sender are selected in the user setting process, the operations illustrated in FIG. 10, FIG. 11, and FIG. 12 may be individually performed corresponding to each selected target. If the operations are performed individually for each selected content, application or sender, the results of operations may differ from one another. In this example, the individual performance of operations may result in the delay of event notification and the change of an event notification scheme. Thus, to prevent such different results, prioritization may be applied. For example, the delay of event notification may have higher priority than the change of an event notification scheme. By the prioritization, it may be possible to avoid conflict in the operation result even when multiple selections are made on content, applications and/or senders in the user setting process.

As described above, an event notification is delayed according to a system state at the time of the occurrence of an event, so that it may be possible to reduce the inconvenience due to the notification.

Further, when an event notification delay is not feasible, an event notification scheme that uses a smaller area of a display screen than the display area of a popup-window or an event notification scheme that does not use the display screen is utilized to indicate the occurrence of an event.

Further, if an audio file is executed by a music player and a default notification scheme for an event includes an output of an audible sound, e.g., a beep sound, the default notification scheme may be changed to a modified notification scheme that displays a notification without outputting the audible sound or vibrates the device. If an e-book program is executed by the apparatus and a default notification scheme for an event includes the display of a popup window, the default notification scheme may be changed to a modified notification scheme that outputs an audible message without displaying the popup window, a modified notification scheme that displays a notification on a status bar without interfering the displayed e-book content, or vibrates the device. When changing the default notification scheme, a portion of or all the notification information may be extracted and processed into another format for the modified notification scheme.

It will be apparent to those skilled in the art that various modifications and amount of change can be made in the present invention without departing from the spirit or scope of the invention. Thus, it is intended that the present invention cover the modifications and amount of changes of this invention provided they come within the scope of the appended claims and their equivalents.

What is claimed is:

1. A method for processing an event notification, comprising:
   recognizing an event to be indicated via a mobile apparatus;
   determining whether a default notification scheme for the event is prohibited by a notification setting of the mobile apparatus; and
   if the default notification scheme for the event is prohibited by the notification setting of the mobile apparatus, determining a modified notification scheme for the event and notifying the event according to the modified notification scheme.

2. The method of claim 1, wherein the modified notification scheme for the event comprises changing a notification time of the default notification scheme or changing the default notification scheme to another notification scheme.

3. The method of claim 1, further comprising:
   determining an execution status of the mobile apparatus; and
   determining that the default notification scheme for the event is prohibited if the execution status of the mobile apparatus corresponds to the notification setting.

4. The method of claim 3, wherein the execution status of the mobile apparatus comprises an execution of a specific type of content or an execution of a specific application.

5. The method of claim 3, further comprising:
   determining a type of content executed by the mobile apparatus,
   wherein the default notification scheme for the event is prohibited according to the type of the content.

6. The method of claim 3, further comprising:
determining a remaining playback time of content executed by the mobile apparatus; and
delaying a notification time of the default notification scheme according to the remaining playback time of the content.

7. The method of claim 6, wherein the notification time of the default notification scheme is delayed if the remaining playback time of the content is less than a threshold, and
the default notification scheme is changed to another notification scheme if the remaining playback time of the content is greater than or equal to the threshold.

8. The method of claim 3, further comprising:
determining an application executed by the mobile apparatus,
wherein the default notification scheme for the event is prohibited according to the executed application.

9. The method of claim 1, further comprising:
determining sender information associated with the event,
wherein the default notification scheme for the event is prohibited according to the sender information.

10. The method of claim 9, wherein the event comprises a receipt of a message from a sender corresponding to the sender information, and
the default notification scheme for the event is prohibited according to an importance value of the sender.

11. The method of claim 1, wherein the event comprises at least one of an incoming call, a receipt of a message, a system state change, an alarm, and a battery low alert.

12. A method for processing an event notification, comprising:
recognizing an event to be indicated via a mobile apparatus;
determining an execution status of the mobile apparatus;
determining whether a default notification scheme for the event is prohibited for the execution status of the mobile apparatus; and
if the default notification scheme for the event is prohibited for the execution status of the mobile apparatus, determining a modified notification scheme for the event and notifying the event according to the modified notification scheme.

13. A mobile apparatus to process an event notification, comprising:
a non-transitory storage device comprising executable instructions which, when executed by one or more processors, causes the one or more processors to perform:
recognizing an event to be indicated via the mobile apparatus;
determining whether a default notification scheme for the event is prohibited by a notification setting of the mobile apparatus; and
if the default notification scheme for the event is prohibited by the notification setting of the mobile apparatus, determining a modified notification scheme for the event and notifying the event according to the modified notification scheme.

14. The mobile apparatus of claim 13, wherein the modified notification scheme for the event comprises changing a notification time of the default notification scheme or changing the default notification scheme to another notification scheme.

15. The mobile apparatus of claim 13, wherein the one or more processors further performs:
determining an execution status of the mobile apparatus; and
determining that the default notification scheme for the event is prohibited if the execution status of the mobile apparatus corresponds to the notification setting.

16. The mobile apparatus of claim 15, wherein the execution status of the mobile apparatus comprises an execution of a specific type of content or an execution of a specific application.

17. The mobile apparatus of claim 15, wherein the one or more processors further performs determining a type of content executed by the mobile apparatus,
wherein the default notification scheme for the event is prohibited according to the type of the content.

18. The mobile apparatus of claim 15, wherein the one or more processors further performs:
determining a remaining playback time of content executed by the mobile apparatus; and
delaying a notification time of the default notification scheme according to the remaining playback time of the content.

19. The mobile apparatus of claim 18, wherein the notification time of the default notification scheme is delayed if the remaining playback time of the content is less than a threshold, and
the default notification scheme is changed to another notification scheme if the remaining playback time of the content is greater than or equal to the threshold.

20. The mobile apparatus of claim 15, wherein the one or more processors further performs determining an application executed by the mobile apparatus,
wherein the default notification scheme for the event is prohibited according to the executed application.

21. The mobile apparatus of claim 13, wherein the one or more processors further performs determining sender information associated with the event,
wherein the default notification scheme for the event is prohibited according to the sender information.

22. The mobile apparatus of claim 21, wherein the event comprises a receipt of a message from a sender corresponding to the sender information, and
the default notification scheme for the event is prohibited according to an importance value of the sender.

* * * * *